US010738829B2

(12) United States Patent
Frank (10) Patent No.: US 10,738,829 B2
(45) Date of Patent: Aug. 11, 2020

(54) WIRE RACE BEARING

(71) Applicant: IMO HOLDING GMBH, Gremsdorf (DE)

(72) Inventor: Hubertus Frank, Höchstadt/Aisch (DE)

(73) Assignee: IMO HOLDING GmbH (DE)

( * ) Notice: Subject to any disclaimer, the term of this patent is extended or adjusted under 35 U.S.C. 154(b) by 0 days.

(21) Appl. No.: 15/998,922

(22) PCT Filed: Feb. 8, 2017

(86) PCT No.: PCT/IB2017/000082
§ 371 (c)(1),
(2) Date: Aug. 16, 2018

(87) PCT Pub. No.: WO2017/141096
PCT Pub. Date: Aug. 24, 2017

(65) Prior Publication Data
US 2019/0186543 A1    Jun. 20, 2019

(30) Foreign Application Priority Data

Feb. 16, 2016    (DE) .................... 10 2016 001 751

(51) Int. Cl.
*F16C 17/10*    (2006.01)
*F16C 23/04*    (2006.01)
(Continued)

(52) U.S. Cl.
CPC ............ *F16C 33/61* (2013.01); *F16C 19/381* (2013.01); *F16C 23/08* (2013.01);
(Continued)

(58) Field of Classification Search
CPC ........ F16C 33/61; F16C 19/381; F16C 23/08; F16C 2300/14; F16C 2360/31
(Continued)

(56) References Cited

U.S. PATENT DOCUMENTS

| 3,802,755 A | 4/1974 | Schluter et al. |
| 4,030,786 A * | 6/1977 | Schluter .................. F16C 19/38 384/453 |

(Continued)

FOREIGN PATENT DOCUMENTS

| BE | 666428 A | 11/1965 |
| CA | 977021 A | 10/1975 |

(Continued)

OTHER PUBLICATIONS

Applicant: IMO Holding GMBH, Application No. PCT/IB2017/000082; International Search Report and Written Opinion, search completed Mar. 27, 2017; 14 pp.

*Primary Examiner* — Marcus Charles
(74) *Attorney, Agent, or Firm* — Tarolli, Sundheim, Covell & Tummino LLP (57) ABSTRACT

The invention is directed to a rolling bearing having at least one row of cylindrical rolling bodies for transmitting axial forces between two annular connection elements which are concentric to a common axis of rotation and which, for the purpose of rotation about the common axis of rotation, are spaced apart from one another by a gap, wherein the at least one row of cylindrical rolling bodies is so arranged that, in the unloaded state of the rolling bearing, the axes of rotation of all the cylindrical rolling bodies of the row lie in a common plane through which the common axis of rotation passes perpendicularly, wherein at least one raceway for the at least one row of cylindrical rolling bodies is in the form of a flat surface of a wire which has on its surface region complementary to the raceway surface an arcuate, convexly curved cross-sectional profile and is thereby inserted at least in some regions into a peripheral recess having a cross-sectional profile complementary thereto in an annular connection element.

16 Claims, 7 Drawing Sheets

(51) Int. Cl.
*F16C 23/08* (2006.01)
*F16C 33/37* (2006.01)
*F16C 33/61* (2006.01)
*F16C 19/38* (2006.01)

(52) U.S. Cl.
CPC .......... *F16C 33/3706* (2013.01); *F16C 17/10* (2013.01); *F16C 23/04* (2013.01); *F16C 2300/14* (2013.01); *F16C 2360/31* (2013.01)

(58) Field of Classification Search
USPC .................. 384/452–455, 462; 416/131, 174
See application file for complete search history.

(56) References Cited

U.S. PATENT DOCUMENTS

| | | | | |
|---|---|---|---|---|
| 4,126,361 | A * | 11/1978 | Bottner | E02F 9/121 384/455 |
| 4,828,405 | A * | 5/1989 | Sinner | F16C 19/381 384/455 |
| 8,282,353 | B2 * | 10/2012 | Russ | F03D 1/0658 416/131 |
| 8,523,453 | B2 * | 9/2013 | Loeschner | F16C 19/49 384/455 |
| 2015/0030453 | A1 * | 1/2015 | Zang | F16C 19/381 416/174 |

FOREIGN PATENT DOCUMENTS

| | | |
|---|---|---|
| CH | 555012 A | 10/1974 |
| DE | 3909664 C1 | 8/1990 |
| DE | 102012004329 A1 | 8/2013 |
| EP | 0301186 A1 | 2/1989 |
| EP | 0388669 A1 | 9/1990 |
| FR | 1440531 A | 5/1966 |
| FR | 2393185 A1 | 12/1978 |
| GB | 2083572 A | 3/1982 |
| JP | S51 143156 A | 12/1976 |

* cited by examiner

WIRE RACE BEARING

CROSS-REFERENCE TO RELATED APPLICATIONS

This application is a U.S. National Stage Application filed under 35 U.S.C. § 371 of PCT/IB2017/000082, filed Feb. 8, 2017, and entitled WIRE RACE BEARING, which International Application claims the benefit of priority from German Patent Application No. 10 2016 001 751.1, filed on Feb. 16, 2016. The entire contents of each of the above-identified patent applications are incorporated herein by reference.

The invention is directed to a device for rotatably coupling at least two annular connection elements which are concentric to a common axis of rotation and are spaced apart from one another by a gap, at least one of which, preferably each of which, has a flat end face with fastening means arranged in a ring for placing and fixing the connection element in question on a footing, chassis, or installation or machine part, wherein there is arranged on each of the two connection elements, in the region of the gap, at least one raceway for at least one row of rolling bodies which run therebetween, and/or at least one slideway, which either slide directly on one another or between which at least one sliding body is slidingly guided.

Such a bearing structure with flat connection surfaces is a typical feature of large bearings, such as are mostly used in practice for absorbing or transmitting high forces or turning or tilting moments. Spherical rolling bodies have only limited suitability for precisely such high loads because they form only an approximately punctiform contact region with the raceway surfaces, where there is then a risk of material overloading in the case of large forces or tilting moments acting from outside. A geometry which has a greater bearing capacity in this respect is obtained when cylindrical rolling bodies are used. These include in particular cylindrical rollers but also barrel-shaped or tapered rolling bodies; such rolling bodies are also to be referred to as "cylindrical" hereinbelow. Such cylindrical rolling bodies are rotationally symmetrical with respect to precisely one well-defined axis of rotation and form linear contact regions with the raceway surfaces, so that external forces or tilting moments are distributed over a much larger contact region and accordingly reduced locally to values which are acceptable in terms of material technology.

On the other hand, large bearings are also subject to further restrictions in many applications; for example, they should not be too heavy and/or too large. However, the annular connection elements of such a large bearing are then exposed to the risk of bending and/or twisting under large loads. This can have the result that the two raceways, between which cylindrical rolling bodies run, no longer have the specified cross-sectional geometry relative to one another but, for example in the case of cylindrical rollers, are no longer parallel to one another in raceway portions affected by deformation. The consequence is that the desired linear contact regions are lost and instead the rolling bodies in question form punctiform, bearing contact only in the region of an edge. This can be even worse than the punctiform contact of a spherical rolling body, because a spherical shape widens quickly starting from the contact point, so that the forces to be transmitted are in any case distributed quickly within such a rolling body and as a result are not dangerous. By contrast, a punctiform contact region at the edge of a cylindrical rolling body widens in only one direction, that is to say towards the middle of the rolling body in the longitudinal direction thereof. Such edges therefore quickly tend to break off, which adversely affects the achievable service life.

Problems can also occur in sliding bearings as a result of bending of the connection elements; in particular, the sliding surfaces in such cases must no longer be parallel to one another in all regions, so that the bearing force is reduced and wear is increased.

The disadvantages of the described prior art result in the problem initiating the invention, which is to develop further a generic device in such a manner that race- and/or slide-way deformations caused by external influences are compensated or at least minimised in order not to compromise the achievable life expectancy of bearing elements such as, for example, rolling or sliding bodies.

This problem is solved in that the at least one race- or slide-way is in the form of a surface of a wire which is preferably flat in a section transverse to its longitudinal direction and which has an arcuate, convexly curved cross-sectional profile in its surface region complementary to the race- or slide-way surface and is thereby inserted at least in some regions into a peripheral recess having a cross-sectional profile complementary thereto in an annular connection element.

The purpose of such a geometry is to create a degree of freedom of movement between the actual race- or slide-way and the connection element in question, allowing the race- or slide-way to maintain its original orientation in space— and especially relative to the opposing race- or slide-way— even if the actual connection element is deformed. In rolling bearings, this serves the purpose of maintaining the linear contact regions of rolling bodies running between the raceways with the two raceways, so that the rolling bodies are accordingly not overloaded; in sliding bearings, as large a contact region as possible is ensured, so that the bearing force is maintained and wear is minimal.

It has been found to be advantageous that the recess for receiving the race- or slide-way wire, and the race- or slide-way wire itself, has a circular profile. The invention is thereby delimited in particular with respect to linear bearings, where the geometric conditions are different.

Preferably, the recess for receiving the race- or slide-way wire is delimited at one or preferably both edges by a convex edge, that is to say a protruding edge in the manner of a ridge and not in the manner of a valley. Accordingly, the surface regions lying on the other side of those recess edges are set back and create space for contact with rolling or sliding bodies or with an opposite slideway itself, so that they do not touch anywhere even in the case of pronounced twisting of a connection element.

It has proved advantageous that the two edges of the recess for receiving the race- or slide-way wire lie in a common plane, in particular when the connection element in question is in the twist-free and non-bent state.

Further advantages arise in that the peripheral recess for receiving the raceway wire has a saddle-shaped curved surface region $O_{sg}$ and a doubly concavely curved surface region $O_{dk}$, which together preferably form the entire surface of the peripheral recess. In other words, there is not a larger, flat or at least linear region either between the saddle-shaped curved surface region $O_{sg}$ and the doubly concavely curved surface region $O_{dk}$ or outside or on the other side of those surface regions $O_{sg}$, $O_{dk}$.

A further constructional provision states that the saddle-shaped curved surface region $O_{sg}$ and the doubly concavely curved surface region $O_{dk}$ should be approximately equal in size, so that:

$|O_{sg}-O_{dk}| \leq 2*\pi cm^2$, for example $|O_{sg}-O_{dk}| \leq 1.5*\pi cm^2$, where preferably $|O_{sg}-O_{dk}| \leq \pi cm^2$, in particular where $|O_{sg}-O_{dk}| \leq 0.5*\pi cm^2$, It should be borne in mind that $\varepsilon = \pi cm^2 = 3.14 \text{ cm}^2$ is very small in relation to a raceway having, for example, a width b of 2 cm and a diameter of approximately 1 m=100 cm diameter, so that: $O = 2 \text{ cm} * 100 \text{ cm} * \pi = 200*\pi \text{ cm}^2 = 628 \pi cm^2$, $O = O_{sg} + O_{dk} \gg O_{sg} - O_{dk}$.

Ideal conditions are present when the peripheral recess for receiving the race- or slide-way wire has an arcuate cross-section. Such an arcuate cross-section allows easy relative movement between the raceway wire and the mounting or recess holding it.

It is recommended that the arcuate cross-sectional profile $q_{kb}$ of the peripheral recess for receiving the race- or slide-way wire is exactly as long as or shorter than a semi-circular arc having a radius corresponding to the transverse radius of curvature $r_q$ of the peripheral recess:

$$q_{kb} \leq \pi*r_q.$$

By means of this measure, the construction height of the rolling bearing can optionally be reduced.

A further development of the invention, according to which the arcuate cross-sectional profile $q_{kb}$ of the peripheral recess for receiving the raceway wire is exactly as long as or longer than the length l of a rolling body running on the raceway surface of the raceway wire inserted therein:

$$q_{kb} \geq l,$$

serves the purpose of allowing the rolling bodies a maximum contact region with the raceway wire and thereby minimising the pressure load thereon.

Provided that the peripheral recess for receiving the raceway wire and the flat end face and the fastening means arranged in a ring for placing and fixing the connection element in question on a footing, chassis, or installation or machine part are produced by machining or shaping of the same common base body of the connection element in question, it can be ensured that the raceway on the raceway wire in question is completely flat when free of external forces.

It is within the scope of the invention that the fastening means arranged in a ring for fixing the connection element in question to a footing, chassis, or installation or machine part are in the form of through-bores or in the form of blind bores preferably provided with an internal thread. The choice of the optimal bore type in a particular case can be governed by the application in question and/or by the local conditions.

According to the invention, two or more raceway wires can be arranged one above the other in different planes, in particular two or more raceway wires of equal length. These race- or slide-way wires, or the race- or slide-ways formed thereon, can either be associated with the same row of rolling bodies and receive the rolling bodies directly between them, or they are associated with different rows of rolling bodies arranged one above the other, in order to bias them against one another.

The peripheral recess for receiving the race- or slide-way wire can be arranged both on a protruding lug or a protruding collar of a lug ring and on at least one carrying or holding ring. It is thus possible to meet all structural requirements and provisions.

A raceway located opposite the raceway ring with respect to the rolling bodies running thereon can be incorporated directly into the annular body of the connection element in question, in particular with hardening of a corresponding surface region.

According to a preferred further development of the invention, a raceway located opposite the raceway ring with respect to the rolling bodies running thereon can also be formed on a raceway wire inserted into a recess therein.

The arrangement can further be achieved in that at least one of two raceway wires associated with a common row of rolling bodies has a rectangular cross-section. Although this raceway wire then cannot turn or twist in its mounting, or in its recess, that is also not necessary because the other raceway ring has that degree of freedom of movement and can accordingly adapt to the raceway ring of rectangular cross-section.

It is further in accordance with the teaching of the invention that a connection element or part thereof, in particular a carrying or holding ring, is integrated with a machine or installation part, in particular with a hub of a wind turbine. It may thereby be possible to achieve a higher degree of stiffness than by screwing a connection element to a machine or installation part that is to be connected.

The cross-section of the actual race- or slide-way surface should be so adapted to the rolling or sliding bodies that a contact region of maximum size is obtained. In the case of a rolling body, this is a linear contact region, while in the case of a sliding body it is an areal contact region.

It has proved advantageous that the rolling bodies of at least one row have precisely one specific axis of rotation. This definition includes all rotationally symmetrical bodies which are not spherical, that is to say, for example, cylindrical or needle rollers, tapered rollers or barrel-shaped rolling bodies.

The invention further provides that, in the unloaded state of the rolling bearing, the (specific) axes of rotation of all the rolling bodies of the at least one row of rolling bodies lie in a common plane through which the common axis of rotation passes perpendicularly. The row in question is preferably an axial rolling body row which is designed solely or predominantly for absorbing and transmitting forces parallel to the axis of rotation.

When the rolling bodies of a row rotate about their longitudinal axes lying in a common plane, cylindrical rolling bodies of an axial bearing row require a raceway that is in the form of a flat surface on the wire which can be inserted into a recess; cylindrical rolling bodies of a radial bearing row preferably run along a raceway having the shape of a cylinder lateral surface, which can optionally be formed on a wire which can be inserted into a recess.

A preferred constructional provision states that—in particular for an axial bearing row—the width, measured in a radial plane spanned by the axis of rotation, of a peripheral recess for receiving a raceway wire is equal to or greater than 0.8 times the length l of a rolling body running on the raceway surface of the raceway wire inserted therein, for example equal to or greater than 0.9 times that length, preferably equal to or greater than 0.95 times that length, in particular equal to or greater than the length of a rolling body running on the raceway surface in question. The rolling bodies are thus able to rest or run on the raceway wire in question over almost their entire length, so that the force distribution and removal in the contact region is optimal.

Furthermore—in particular for an axial bearing row—the opening width, measured in the radial direction to the axis of rotation, of the peripheral recess should be equal to or greater than 0.8 times the length l of a rolling body running on the raceway surface of the raceway wire inserted therein, for example equal to or greater than 0.9 times that length, preferably equal to or greater than 0.95 times that length, in particular equal to or greater than the length l of a rolling body running on the raceway surface in question. Such a predominantly radial extent of the peripheral recess allows the raceway wire inserted therein to form a large, flat contact region for transmitting high axial forces.

The extent of the raceway wire parallel to the axis of rotation of the rolling bearing should—in the case of an axial bearing row—be equal to or smaller than the diameter of a rolling body running on the raceway surface of the raceway wire, preferably equal to or smaller than the radius of a rolling body running on the raceway surface of the raceway wire, in particular equal to 0.9 times the radius of a rolling body running on the raceway surface of the raceway wire. The smaller the axial extent of a raceway wire, the smaller and lighter the construction of the rolling bearing in question can optionally be.

In addition to the axial rolling body rows, the invention is preferably distinguished by a further row of rolling bodies which serves as a radial bearing. The rolling bodies thereof can differ from the other rows of rolling bodies in terms of their type and size.

The invention opens up the possibility that preferably cylindrical rolling bodies are guided in a cage or in a plurality of cage segments. The rolling bodies are thus only able to roll together, instead of moving relative to one another.

An alternative embodiment of the invention is distinguished in that spacer bodies are inserted between two adjacent rolling bodies. Since spacer bodies do not have longitudinal spars which engage around the rolling bodies at their end faces, the gap in the region of those rolling bodies can be designed with a minimal radial extent, so that installation space and weight are saved.

The invention can be developed further in that in at least one row, the rolling bodies having a specific axis of rotation have a lateral surface which follows a cylinder lateral surface at least in some regions.

It is within the scope of the invention that, in at least one row, the rolling bodies having a specific axis of rotation and a cylindrical lateral surface at least in some regions run along flat raceways.

The invention can be optimised further in that, in at least one row, the rolling bodies having a specific axis of rotation have a lateral surface which follows a lateral surface of a truncated cone or of a barrel.

A preferred constructional provision states that, in at least one row, the rolling bodies having a specific axis of rotation and a frustoconical lateral surface run along at least one conical raceway, that is to say a raceway having a cross-section which is inclined both relative to the axis of rotation of the device and relative to the ground plane thereof. Friction slip can thus be avoided completely in axial bearing rows.

Finally, it can be provided that, in at least one row, the rolling bodies having a specific axis of rotation and a barrel-shaped lateral surface run along at least one raceway whose cross-section is adapted to a longitudinal section through the barrel-shaped lateral surface of a barrel-shaped rolling body.

Further features, details, advantages and effects based on the invention will become apparent from the following description of a preferred embodiment of the invention and with reference to the drawings, in which.

In all the embodiments shown in the drawings of a device 1 according to the invention for rotatably coupling at least two annular connection elements 2, 3 which are concentric to a common axis of rotation and are spaced apart from one another, the profile of the cut rings adjoining the cut face has been omitted. It is thus intentionally not specified which of the two connection elements 2, 3 is located on the outside and which on the inside, since this is not important for the invention; in each embodiment shown, the connection element 2 shown on the left can be configured as either the outer or the inner ring, and the connection element 3 shown on the right can accordingly be configured as either the inner or the outer ring.

In all the embodiments, the device 1 is in the form of a large rolling bearing, preferably having a diameter of approximately 1 m or more. Furthermore, the devices 1 shown can be provided with various built-on elements (not shown), for example with a housing, with teeth on at least one connection element 2, 3 with which a drive element such as, for example, a sprocket or a screw meshes, further with a brake, measuring sensors, etc.

Figure 1:
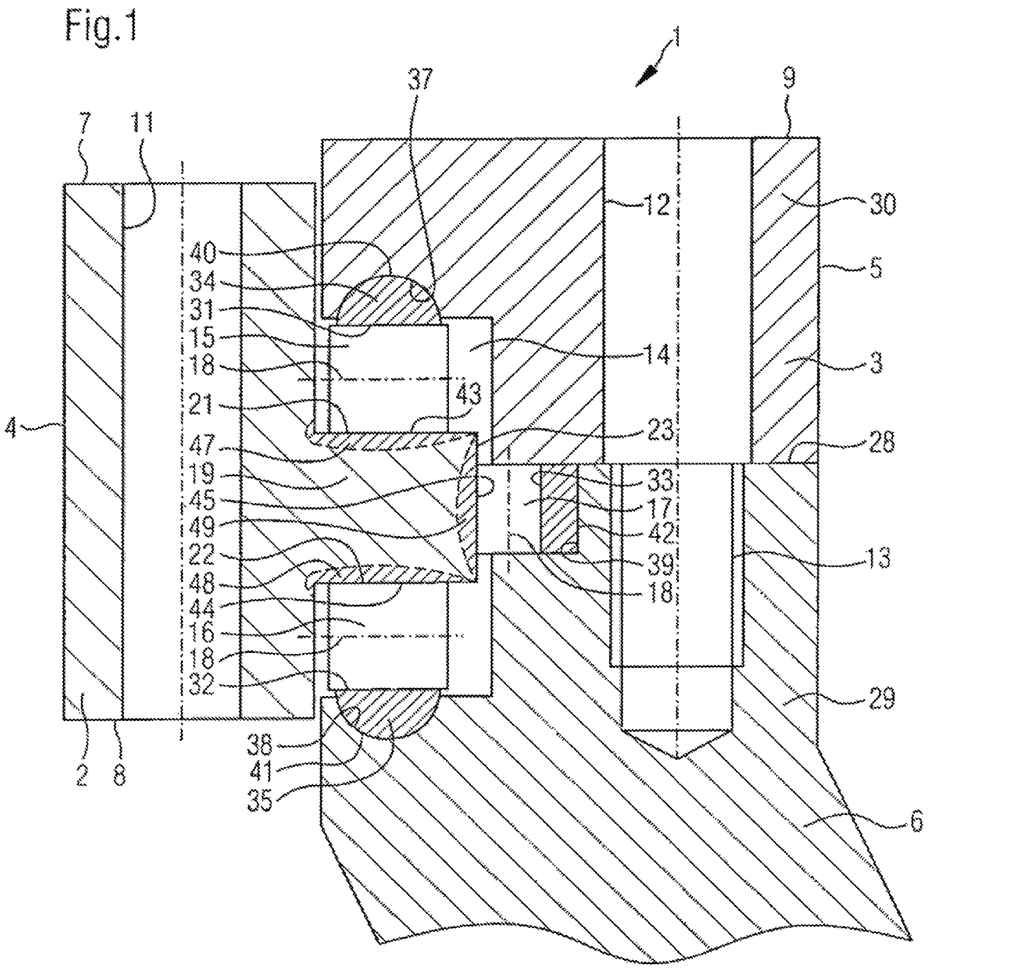
FIG. 1 is a section through the annular connection elements of a rolling bearing according to the invention.

A particular feature of such large rolling bearings is that, on account of their dimensions, they are not connected at their outer lateral surfaces 4, 5 but are either integrated with an installation or machine part to be connected, as in the embodiment according to FIG. 1, where part of the connection element 3 shown on the right is integrated with the hub 6 of a wind turbine to form a single piece, or they have at least one flat connection surface 7, 8, 9, 10 for contact over the entire surface, or largely over the entire surface, with a footing, chassis, or installation or machine part. For immovable fixing to such a footing, chassis, or installation or machine part, a plurality of fastening elements 11, 12 are arranged distributed in a ring in such a flat connection surface 7, 8, 9, 10. These fastening elements are preferably bores, for example through-bores as in the connection element 2 shown on the left in FIG. 1, or blind bores as in the connection element 3 shown on the right in FIG. 1. While through-bores are preferably configured without a thread, blind bores preferably have an internal thread 13 which extends over at least a portion of their length. By means of a plurality of screws pushed into or through these fastening bores 11, 12, the connection element 2, 3 in question is pressed firmly and thus with frictional engagement against a connection structure in the axial direction.

As can further be seen in the drawing, a gap 14 is provided between the two connection elements in all the embodiments shown, in order to permit relative rotation between the two connection elements 2, 3.

In practice, large rolling bearings having the construction shown are mostly to absorb or transmit high forces or turning or tilting moments. Spherical rolling bearings are less suitable for this purpose because they form only an almost punctiform contact region with the raceway surfaces in question. Within those small contact regions, material overloading can quickly occur in the case of large forces or tilting moments acting from outside.

The invention therefore provides that at least one row of cylindrical rolling bodies 15, 16, 17 runs in the gap 14. The cylindrical rolling bodies 15, 16, 17 are preferably in the form of cylindrical rollers, but other non-spherical geometries would also be conceivable, for example barrel-shaped or tapered rolling bodies. Such rolling bodies 15, 16, 17 are characterised in that they are rotationally symmetrical to precisely one, well-defined axis of rotation, which will be referred to hereinbelow as their longitudinal axis 18. With a suitable configuration of the raceways, such cylindrical rolling bodies 15, 16, 17 are capable of forming linear contact regions, so that external forces or tilting moments can be distributed over a much larger contact region, so that material overloading is far more rare.

However, cylindrical rolling bodies 15, 16, 17 are only able to transmit forces radially to their longitudinal axis 18, not force components in the direction of their longitudinal axis 18, as is possible with spherical rolling bodies, in particular in so-called four-point bearings. Therefore, different rows of rolling bodies 15, 16 are conventionally used for axial forces in both directions, that is to say downwards as well as upwards, and a third row of rolling bodies 17 is provided for transmitting radial forces.

As is apparent from the drawing, all the rolling bearing embodiments therefore have three or more rows of rolling bearings 15, 16, 17.

Preferably, in at least one row, the cylindrical rolling bodies 15, 16, 17 are so arranged that the longitudinal axes 18 of all the rolling bodies 15, 16, 17 in the row in question either lie in a plane or on a single lateral surface of a single, imaginary, rotationally symmetrical body, that is to say a cone surface or a cylinder surface.

Rolling bodies 15, 16 whose longitudinal axes 18 lie in a plane transmit predominantly or solely axial forces between the connection elements 2, 3, that is to say forces in the direction of the axis of rotation between them, and rows with rolling bodies 15, 16 oriented in that manner are therefore to be referred to as axial rolling body rows.

Rolling bodies 17 whose longitudinal axes 18 lie on a cylinder lateral surface transmit predominantly or solely radial forces between the connection elements 2, 3, that is to say forces radially to the axis of rotation, and rows with rolling bodies 17 oriented in that manner are therefore to be referred to as radial rolling body rows.

Rolling bodies whose longitudinal axes lie on a cone lateral surface transmit both radial and axial forces between the connection elements 2, 3. However, such rolling bodies rarely occur within the context of the preferred embodiments.

In order to provide raceways for each of a plurality of rows of rolling bodies 15, 16, 17, one connection element 2 is in the form of a so-called lug ring with a peripheral lug 19 or a peripheral collar.

Preferably, such a lug 19 or such a collar has a rectangular or square cross-section with two flat flanks 21, 22 and a cylindrical or hollow-cylindrical end face 23, which can each serve as raceways for rolling bodies 15, 16, 17, as can be seen in FIG. 1.

In order also to be able to transmit axial forces, the flanks 21, 22 of the lug 19 or of the collar must be overlapped by the other connection element 3 in the radial direction, relative to the axis of rotation of the rotation device 1. For this purpose, the connection element 3 that is not in the form of a lug ring has a C-shaped geometry on its lateral surface facing the gap 14, that is to say it has at least one peripheral groove facing the gap 14 and in which the lug 19 or the collar engages, spaced apart by the gap 14. The groove has two flanks and a base, where raceways for each of the rolling bodies 15, 16, 17 are located.

However, the lug 19 engaging peripherally in the groove, or the collar engaging peripherally therein, prevent the two connection elements 2, 3 from being assembled. For this reason, the connection element 3 that is not in the form of a lug ring is divided in the region of the groove into two adjacent rings which adjoin one another along a preferably flat surface 28, namely into a carrying ring 29 which engages beneath the lug 19 or the collar and a holding ring 30 which engages over the lug 19 or the collar. For mutual centering, a peripheral shoulder can be provided in the region of the separating surface 28, so that the carrying ring and the holding ring 29, 30 can only be joined together so that they are in contact over their entire surface if they are oriented exactly concentrically—that is to say without offset in the radial direction.

Preferably, the gap 14 is sealed at one or both mouths, that is to say beyond the outermost rolling body row 15, 16, 17 in each case, by a sealing means, preferably an annular sealing means. It is thus possible to fill the cavity in the gap 14 wholly or partially with a lubricant, for example with lubricating grease or lubricating oil.

As already mentioned, large rolling bearings according to the invention are often exposed to large, external forces or tilting moments, so that cylindrical rolling bodies 15, 16, 17 are preferred. However, this does not exclude the possibility that the connection elements 2, 3 deform from their original ideal annular shape, for example into a slightly elliptical shape. Such deformation could be prevented by solid stiffeners, but this would lead to an undesirable increase in volume and especially weight in many applications. For example, the blades of a wind turbine are to be as lightweight as possible. This requirement also applies to the rotor blade bearings, where the individual blades are connected to the hub of the wind turbine in such a manner that they are adjustable, that is to say rotatable about their longitudinal axis. On the one hand, twisting of a blade as a result of diverse forces acting from outside leads to deformation of its connection surface, which without strict countermeasures is inevitably transmitted to the connection element 2, 3 connected thereto. On the other hand, the entire wind turbine, including all the blades and rotor blade bearings, together with the hub, must be carried by the rotor bearing or main bearing and should therefore be as lightweight as possible. Stiffeners in the region of the rotor blade bearings are therefore mostly undesirable. It is therefore preferred to accept slight deformation of the connection elements 2, 3.

Such deformation of the connection elements 2, 3 has at least two serious consequences which adversely affect the bearing in question.

On the one hand, the two connection elements 2, 3 do not deform in the same direction but differently, for example elliptically, but in such a manner that the longitudinal axes of the two ellipses are not concentric or parallel to one another, but in most cases in such a manner that the longitudinal axes of the two ellipses enclose an angle with one another or are even at right angles to one another. The gap width in the region of the mouth of the gap 14 thereby changes unpredictably, and some gap sealing may then no longer fulfil its purpose of reliable sealing, which leads to leakage of the lubricant.

On the other hand, bending and/or twisting of the connection elements 2, 3 can occur, especially likewise differently in the two connection elements 2, 3. Specifically in the case of cylindrical rolling bodies 15, 16, 17, this has the result that the two raceways of the two connection elements 2, 3 between which the rolling bodies 15, 16, 17 run are no longer oriented cross-sectionally parallel to one another at least in certain portions of the periphery of the connection elements 2, 3. This then has the result that the cylindrical rolling bodies 15, 16, 17 are no longer able to form the desired linear contact region with the raceways, but only the punctiform contact region known in spherical rolling bodies 15, 16, 17. The bearing capacity of the rolling bodies 15, 16, 17 in question thereby falls, and if the external loads are not reduced immediately, the rolling bodies 15, 16, 17 bearing on only one of their edges, or the raceways supporting them, can be damaged.

As a remedy, it is provided according to the invention that at least one raceway for at least one row of cylindrical rolling bodies 15, 16, 17 is not formed directly on the connection element 2, 3 in question, that is to say is not formed by shaping or working of the base body of the connection element 2, 3 in question, into which the fastening bores 11, 12, for example, are also incorporated. Instead, at least one such raceway 31, 32, 33 is situated on a raceway wire 34, 35 which is inserted into a peripheral recess 37, 38, 39 in the connection element 2, 3 in question.

The raceway 31, 32, 33 is adapted to the shape and orientation of the rolling bodies 15, 16, 17 running thereon. In cylindrical rollers 15, 16, 17, a section transversely through the raceway 31, 32, 33 at the raceway wire 34, 35 in question is stretched linearly, as shown in FIG. 1. However, the shape of the raceway 31, 32, 33 itself can be different. Thus, the raceways 31, 32 for axial rolling body rows 15, 16 are flat, while the raceway 33 for a radial rolling body row 17 is cylindrical or hollow-cylindrical.

The raceway wires 34, 35 are inserted into the recess 37, 38, 39 in question and are supported thereby over the entire surface at their rear side 40, 41, 42 remote from the raceway 31, 32, 33. Pressure forces through a raceway wire in particular can thereby be introduced directly into the body of the connection element 2, 3 in question. This is made possible in that a cross-section through the recess 37, 38, 39 in question corresponds to the cross-sectional profile on the rear side 40, 41, 42 of the raceway wire 34, 35 inserted therein.

However, there may nevertheless be a possibility of movement between raceway wires 34, 35 and the recesses 37, 38 surrounding them, namely when the cross-sectional profile on the rear side of the raceway wire 34, 35 and a cross-section through the recess 37, 38 in question each correspond to an arc of a circle, as is realised in FIG. 1 in the two raceway wires 34, 35 for the axial rolling body rows 15, 16. In this case, rotation and/or twisting of such a raceway wire 34, 35 within and relative to the recess 37, 38 receiving it is possible. The raceways on both sides of a cylindrical rolling body 15, 16, 17 can thus be kept parallel, or a parallel adjustment is possible, and consequently a cylindrical rolling body 15, 16, 17 is always able to form linear contact regions with both raceways even if one or both connection elements 2, 3 are twisted. Reduction to punctiform contact regions is avoided.

The function of such raceway wires 34, 35 with an arcuate cross-section of their rear side 40, 41, 42 remote from the respective raceway 31, 32, 33 can be envisaged as follows:

If a connection element 2, 3 twists differently to the respective other connection element 3, 2, the cross-sections of the two raceways 31, 43; 32, 44; 33, 45 enclosing a cylindrical rolling body 15; 16; 17 between them would become out of true relative to one another, that is to say no longer parallel to one another as shown in FIG. 1 for the force-free state. The clear gap 14 would then have a slightly trapezoidal shape in the region of one roller 15, 16, 17. The pressure exerted by the roller 15, 16, 17 on the raceways 31, 43; 32, 44; 33, 45 then increases in the region of the shorter of the two mutually parallel sides of the trapezium, while the pressure on the opposite, longer side of the trapezium falls. This results in an unsymmetrical influence on the raceway wire 34, 35, with the effect that the raceway wire rotates inside its mounting, that is to say the peripheral recess 37, 38, 39, until the pressure in the region of its two edges is approximately equal again.

Since in a normal case a connection element 2, 3 bends or twists to different degrees at different points of the periphery, the raceway wire 34, 35 is forced likewise to twist.

However, the cross-sectional area $Q_L$ of a raceway wire 34, 35 is significantly smaller than the cross-sectional area $Q_A$ of the connection element 2, 3 in question, so that a far smaller force is required to twist the raceway wire 34, 35 than to twist the connection element 2, 3 itself. The raceway wire 34, 35 is thus "softer" than the connection element 2, 3 and is therefore able to compensate for all the twisting thereof. The twisting of the raceway wire 34, 35 is actually opposed to the twisting of the connection element 2, 3, so that the absolute twisting of the raceway wire 34, 35 in question—based on an absolute reference system and not on the connection element 2, 3 in question—is smaller than the twisting of the connection element 2, 3 itself, ideally is or remains approximately zero. Overall, therefore, the raceway wire 34, 35 ideally does not twist but only rotates within or relative to the recess 37, 38, 39 receiving it.

As stated above, a raceway wire 34, 35 according to the invention can have a relatively small cross-section $Q_L$, for example $Q_L \leq 0.2 * Q_A$, preferably $Q_L \leq 0.1 * Q_A$, in particular $Q_L \leq 0.05 * Q_A$, In order that the cylindrical rolling body 15, 16, 17 cannot touch the connection element 2, 3 itself when a raceway wire 34, 35 rotates in its mounting, the width of the raceway 31, 32, 33 on the raceway wire 34, 35 and thus its width overall, should be at least almost or exactly the same as the length of the cylindrical rolling body 15, 16, 17 in question itself.

It is additionally expedient if the raceway 31, 32 of a raceway wire 34, 35 in the force-free initial state is elevated at at least one of its two longitudinal edges above the edge of the recess 37, 38 serving as the mounting, so that the raceway 31, 32 does not enter the recess 37, 38 in the case of a relative rotation of the edge. This can be achieved, for example, in that the maximum depth of the recess 37, 38 serving as the mounting is smaller than the maximum thickness of the raceway wire 34, 35 in the region of the middle of the raceway.

In FIG. 1, the recesses 38, 39 for the raceway wires 35 are located in the carrying ring 29, while the recess 37 for the raceway wire 34 is formed in or incorporated into the holding ring 30.

The raceways 43, 44 are formed by the flanks 21, 22 of the lug 19, while the raceway 45 is formed by the free end face 23 thereof. These raceways are preferably hardened, in particular surface-hardened; the hardened regions 47, 48, 49 will be seen in FIG. 1.

In order that the raceways 31, 32, 33 formed on the raceway wires 34, 35 have a comparable bearing capacity, the raceway wire 34, 35 in question can likewise be hardened, preferably through-hardened because of its small cross-section $Q_L$, although surface-hardening would also be possible. In addition, it would also be possible to harden the surface, or inside, of one, a plurality or all of the recess(es) 37, 38, 39, in particular by surface hardening.

It can further be seen in FIG. 1 that the bearing 1 in question is created for a predominantly axial load, as is the case inter alia in rotor blade bearings of a wind turbine. The axial rolling bodies 15, 16 are therefore larger than the radial rolling bodies 17, corresponding to an increased axial carrying force. The axial rolling bodies 15, 16 therefore also tend to be overloaded in terms of force and are designed to be rotatable in their mounting as a result of raceway wires 34, 35 with an arcuate cross-section in the region of the rear side 40, 41, while the raceway wire for the radial rolling bodies 17, which are subject to a far smaller load, has a rectangular cross-section and is thus not rotatable in its mounting having the same cross-section.

Moreover, it should also be mentioned that a raceway wire 34, 35 could in principle be closed to form a ring; however, it is preferably not completely closed, so that, in the case of temperature changes, the raceway wire 34, 35 is able to stretch or shrink in its mounting, if required, in the circumferential direction of the connection element 2, 3 and is thus always supported at its rear side 40, 41, 42 over its entire surface on the base of the recess 37, 38, 39. A small gap can therefore be provided at a joint of its ends which may be present, as play for any expansion which may be necessary. However, in order that the cylindrical rolling bodies 15, 16, 17 are not overloaded or damaged when they run over such a joint, the end faces of the raceway wire 34, 35, preferably do not extend in a radial plane spanned by the axis of rotation of the rolling bearing but can run inclined thereto, that is to say, for example, in such a manner that the joint in the raceway 31, 32, 33 runs out of true both to a radial plane spanned by the axis of rotation and to the running direction of the rolling bodies 15, 16, 17, for example at an angle of from 30° to 60° relative to the running direction of the rolling bodies 15, 16, 17.

Figure 2:
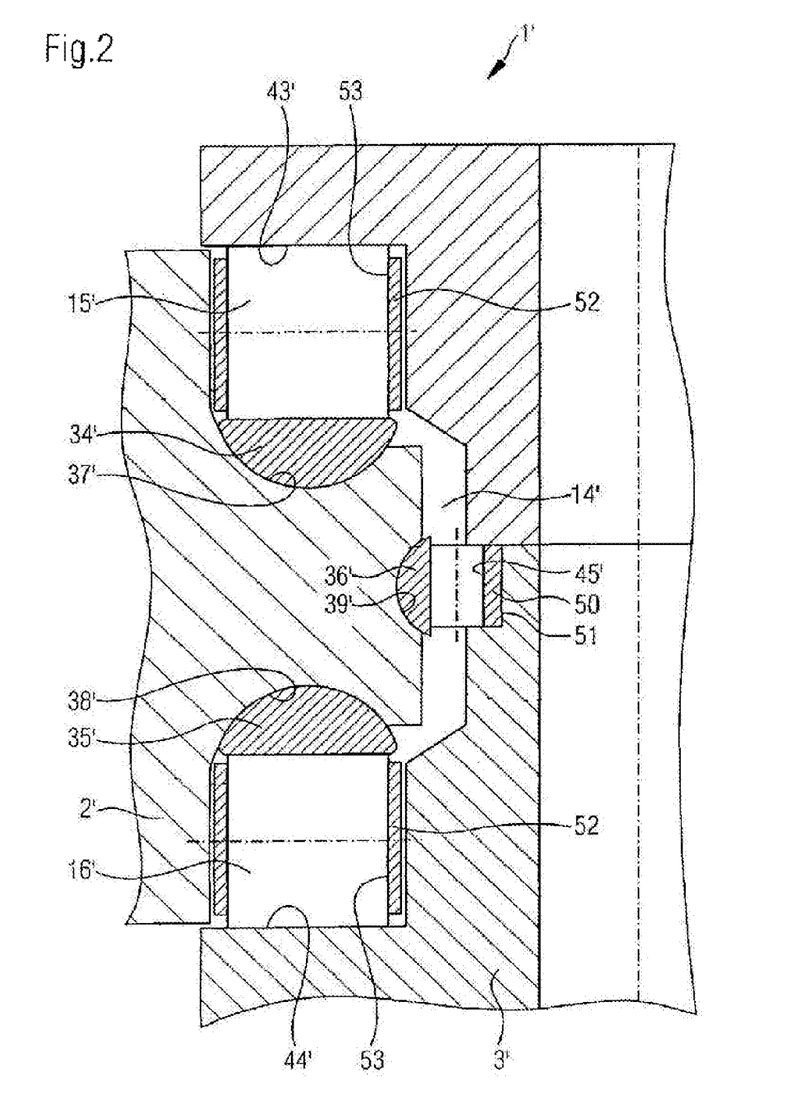
FIG. 2 is a section through the annular connection elements of a modified embodiment of the invention, partially truncated, wherein the rolling bodies are guided in cages.

It will be seen in FIG. 2 that the raceway wires 34', 35', 36' can also be received in recesses 37', 38', 39' in the connection element 2' in the form of a lug ring, while the other raceways 43', 44', 45' can be formed directly in the connection element 3' subdivided into the carrying and holding ring; these can also be hardened there.

It will further be seen in FIG. 2 that a roller row can also be enclosed between two raceway wires 36', 50. Of those raceway wires, one raceway wire 36' has a rear side of arcuate shape, while the other raceway wire 50 has a rectangular cross-section with a flat rear side 51.

Finally, in the bearing construction 1' according to FIG. 2, the gap 14' in the region of the axial cylindrical rolling bodies 15', 16' is wider than the length thereof, namely by an amount which allows a cage 52 to be inserted into the gap 14', in each of the window-like openings 53 of which a cylindrical rolling body 15', 16' is guided.

Figure 3:
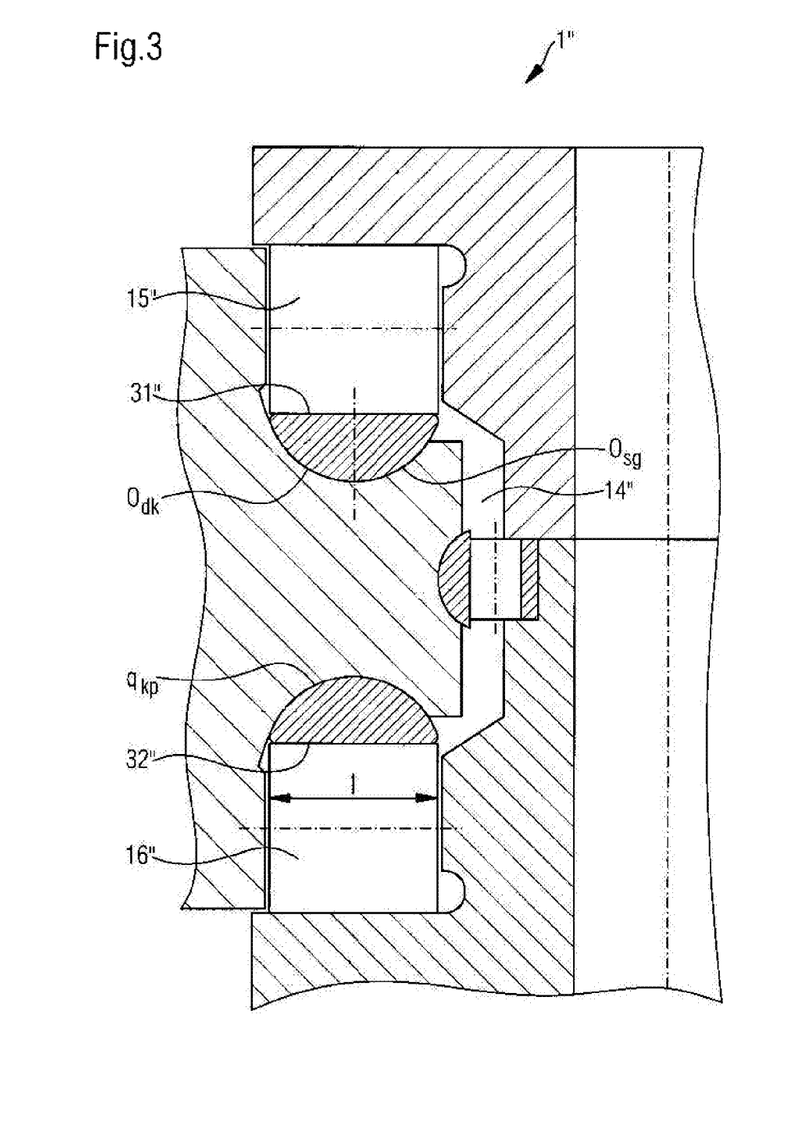
FIG. 3 is a representation corresponding to FIG. 2 of another embodiment of the invention, wherein the rolling bodies are guided by spacer bodies.

FIG. 3 shows a further modified bearing construction 1". This differs from the bearing construction 1' of FIG. 2 only in that the width of the gap 14" is only slightly larger than the length of the axial rolling bodies 15", 16". This is made possible in that, in the bearing construction 1", the axial rolling bodies 15", 16" are not guided by cages 52 but are simply kept apart in the circumferential direction by means of spacer bodies 54.

Figure 4:
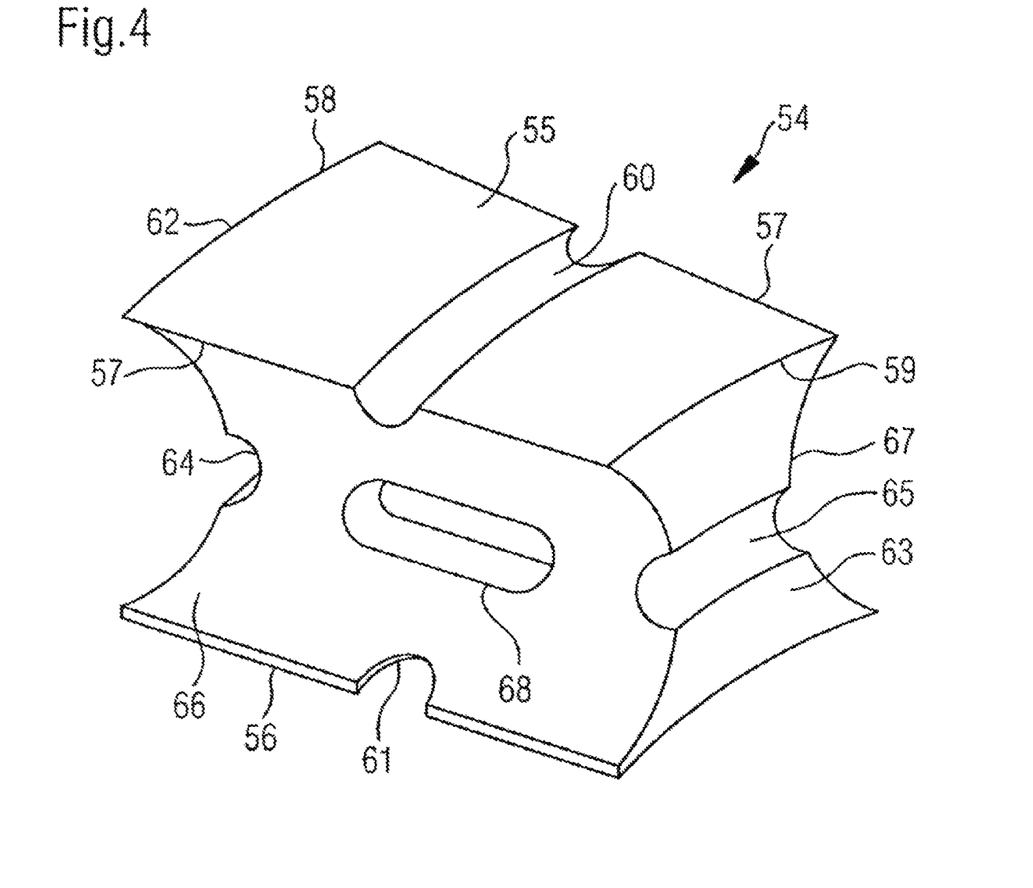
FIG. 4 is a perspective view of a spacer body used in the embodiment according to FIG. 3.

Such a spacer body 54 is shown in perspective in FIG. 4. It will be seen that it is delimited substantially by six surfaces:

The upper side 55, like the lower side 56, is flat. These two sides 55, 56 can be identical or mirror images of one another, based on a central horizontal plane; they are preferably parallel to one another but preferably are not rectangular; instead, only their edges 57 extending radially with respect to the bearing axis of rotation are straight; the two other edges 58, 59 are arcs which surround the bearing axis of rotation concentrically. An upper and a lower lubrication groove 60, 61 likewise each have a curved profile concentric to the bearing axis of rotation.

The radially outer delimiting surface 62 of the spacer body 54 is a piece of a cylinder lateral surface whose longitudinal axis corresponds to the bearing axis of rotation. By contrast, the radially inner delimiting surface 63 of the spacer body 54 is a piece of the lateral surface of a hollow cylinder whose longitudinal axis corresponds to the bearing axis of rotation. Both the radially outer delimiting surface 62 and the radially inner delimiting surface 63 of the spacer body 54 have a lubrication groove 64, 65 extending in the circumferential direction of the raceways 31", 32".

The remaining two sides 66, 67 of the spacer body 54 face the adjacent rolling bodies 15", 16". These are each pieces of the lateral surface of a hollow cylinder whose longitudinal axis corresponds to the longitudinal axis of the adjacent rolling body 15", 16". In order that a small lubrication gap remains between the spacer body 54 and the adjacent rolling body 15", 16", the radius of curvature of the two mutually symmetrical, hollow-cylindrical sides 66, 67 is slightly larger than the radius of the rolling body 15", 16" in question.

The spacer body 54 has symmetry about a plane running between the upper and lower side 55, 56 and parallel thereto. In the region of this central plane of symmetry, the spacer body 54 has a through-opening 68, preferably in the form of an elongate hole parallel to the upper and/or lower side 55, 56, between the two mutually symmetrical, hollow-cylindrical sides 66, 67. This through-opening 68 also serves for distributing the lubricant.

Figure 5:
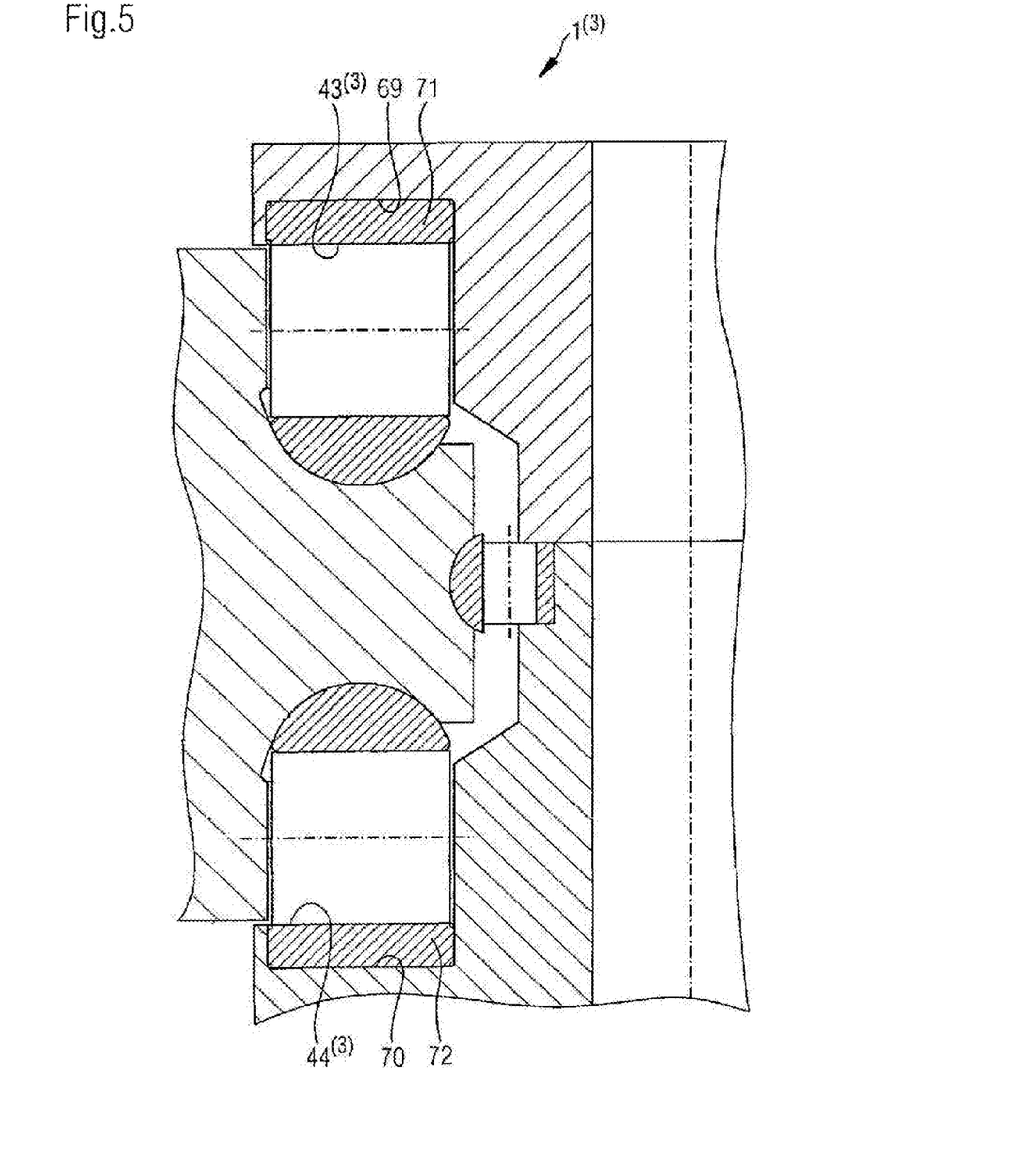
FIG. 5 is a representation corresponding to FIG. 3 of a further modified embodiment of the invention.

A further bearing construction $1^{(3)}$ is to be seen in FIG. 5. This differs from the bearing construction 1" according to FIG. 3 especially in that, instead of the raceways 43", 44" incorporated directly into the connection element 2", 3", there are provided raceway wires 71, 72, likewise inserted in recesses 69, 70, on which the raceways $43^{(3)}$, $44^{(3)}$ are formed. The raceway wires 71, 72, like the recesses 69, 70 receiving them, each have a rectangular cross-section, preferably an elongate cross-section, the depth of which is smaller than the width of the raceways $43^{(3)}$, $44^{(3)}$. Such an arrangement is moreover also possible in the embodiment according to FIG. 2, that is to say the recesses 69, 70 for the additional raceway wires 71, 72 could also be incorporated in the lug 19.

Figure 6:
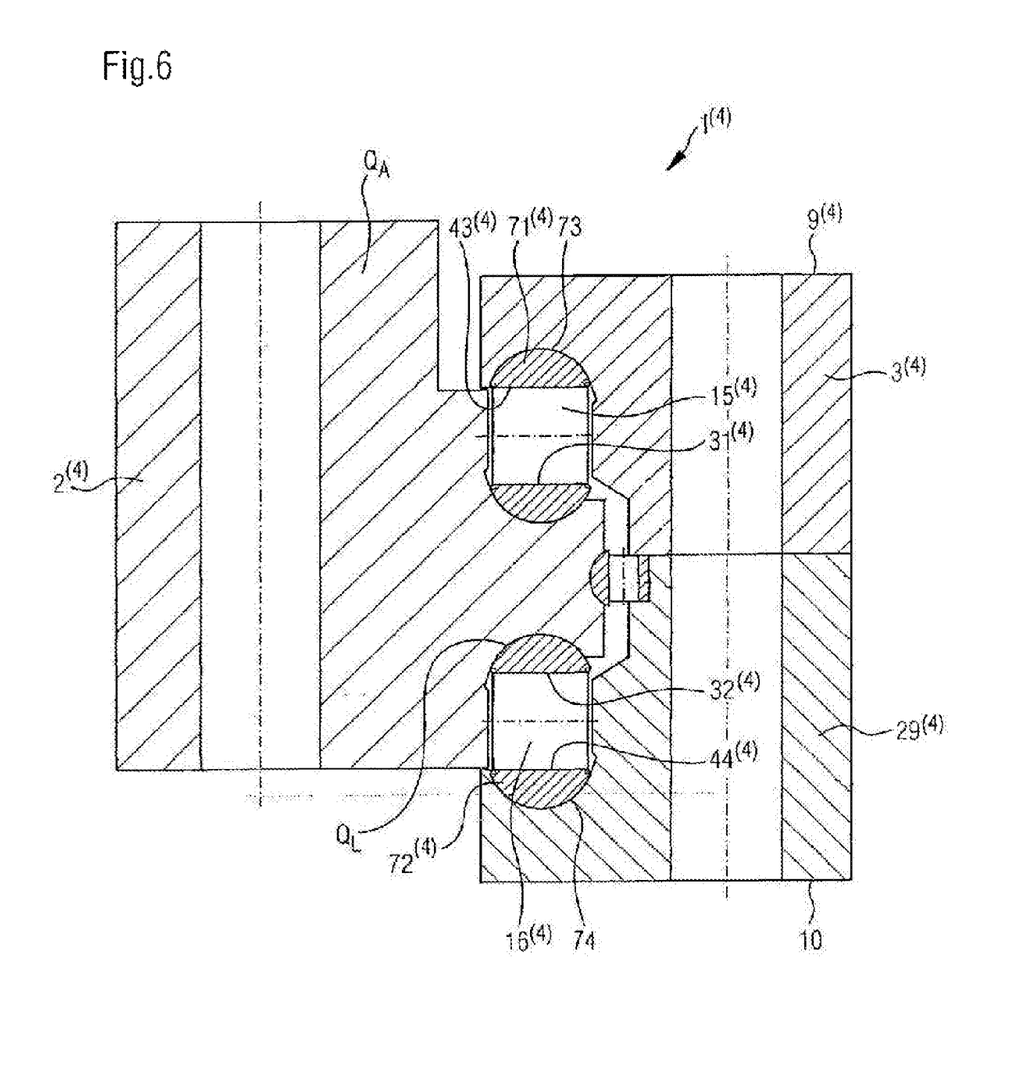
FIG. 6 is a representation corresponding to FIG. 1 of yet another embodiment of the invention.

The bearing construction $1^{(4)}$ shown in FIG. 6 differs from the bearing construction $1^{(3)}$ according to FIG. 5 especially in that the rear sides 73, 74 of the additional raceway wires $71^{(4)}$, $72^{(4)}$ have arcuate cross-sections, as do the insides, complementary thereto, of the recesses receiving them. The two raceways are thus able to rotate in their mounting-like recess, as required, relative to the respective connection element $2^{(4)}$, $3^{(4)}$ and thereby untwist, so that the rolling bodies $15^{(4)}$, $16^{(4)}$ enclosed between them ideally have two completely flat raceways $31^{(4)}$, $32^{(4)}$, $43^{(4)}$, $44^{(4)}$ even in the case of twisted connection elements $2^{(4)}$, $3^{(4)}$.

Figure 7:
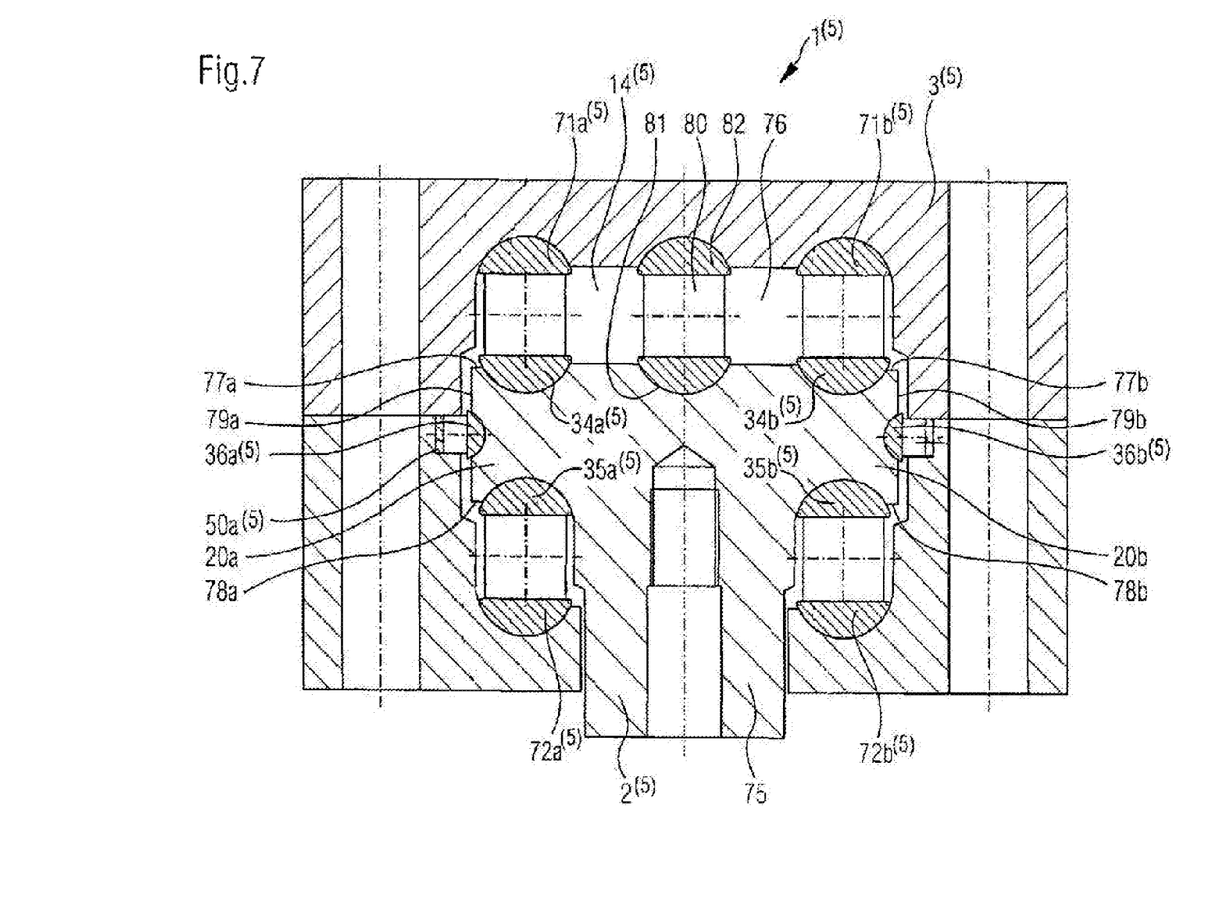
FIG. 7 shows a further embodiment of the invention in a section transversely through the annular connection elements.

FIG. 7 shows a further bearing construction $1^{(5)}$ which differs from the bearing construction $1^{(4)}$ according to FIG. 6 especially by the cross-sectional geometry of the two annular connection elements $2^{(5)}$, $3^{(5)}$.

The connection element $2^{(5)}$ here has an approximately T-shaped cross-section, for example similar to the cross-section of a T-section. This geometry comprises a central pillar 75 and a crosspiece 76 placed transversely above it and is also referred to as a tau cross, Egyptian cross or Saint Anthony's cross. The ends of the upper crosspiece 76 project laterally beyond the central pillar 75 and each form a collar 20a, 20b which has a similar function as the lug 19 of the connection element 2 according to FIG. 1; in particular, there can be provided on the upper and lower side 77a, 78a; 77b, 78b of each collar 20a, 20b and on the end faces 79a; 79b thereof raceways for rolling bodies 15a, 16a, 17a; 15b, 16b, 17b running along thereon. A further row of axial rolling bodies 80 can run centrally above the pillar-like middle portion 75 in the gap $14^{(5)}$ between the two connection elements $2^{(5)}$, $3^{(5)}$.

All the raceways for all the rolling bodies 15a, 16a, 17a; 15b, 16b, 17b, 80 can be arranged on raceway wires $34a^{(5)}$, $71a^{(5)}$, $35a^{(5)}$, $72a^{(5)}$, $36a^{(5)}$, $50a^{(5)}$, $34b^{(5)}$, $71b^{(5)}$, $35b^{(5)}$, $72b^{(5)}$, $36b^{(5)}$, 81, 82.

The rear cross-sections of all the raceway wires $34a^{(5)}$, $71a^{(5)}$, $35a^{(5)}$, $72a^{(5)}$, $34b^{(5)}$, $71b^{(5)}$, $35b^{(5)}$, $72b^{(5)}$, 81, 82 for axial rolling bearings 15a, 16a, 15b, 16b, 80 are arcuate, as are the rear cross-sections of a raceway wire $36a^{(5)}$, $36b^{(5)}$ for radial rolling bearings $17a^{(5)}$, $17b^{(5)}$; in the case of the latter, one raceway wire $50a^{(5)}$ can have a rectangular cross-sectional geometry.

The described properties of the various bearing constructions 1; 1'; 1''; $1^{(3)}$; $1^{(4)}$; $1^{(5)}$ are largely compatible with one another. Thus, for example, all the raceways can be hardened, in particular all the raceway wires. The gap 14 in the region of the rolling bodies should always be of a sufficient size that the edges and end faces of the rolling bodies cannot touch anywhere in the event of twisting of the connection elements 2, 3. The raceway wires can be closed or interrupted in all the embodiments, whereby the geometry of the ends of the raceway wires can have the above-described inclination in all the embodiments.

| List of reference numerals | |
|---|---|
| 1 | Device |
| 2 | Connection element |
| 3 | Connection element |
| 4 | Lateral surface |
| 5 | Lateral surface |
| 6 | Hub |
| 7 | Connection surface |
| 8 | Connection surface |

| List of reference numerals | |
|---|---|
| 9 | Connection surface |
| 10 | Connection surface |
| 11 | Fastening element |
| 12 | Fastening element |
| 13 | Internal thread |
| 14 | Gap |
| 15 | Rolling body |
| 16 | Rolling body |
| 17 | Rolling body |
| 18 | Longitudinal axis |
| 19 | Lug |
| 21 | Flank |
| 22 | Flank |
| 23 | End face |
| 28 | Joint |
| 29 | Carrying ring |
| 30 | Holding ring |
| 31 | Raceway |
| 32 | Raceway |
| 33 | Raceway |
| 34 | Raceway wire |
| 35 | Raceway wire |
| 37 | Recess |
| 38 | Recess |
| 39 | Recess |
| 40 | Rear side |
| 41 | Rear side |
| 42 | Rear side |
| 43 | Raceway |
| 44 | Raceway |
| 45 | Raceway |
| 47 | Hardened region |
| 48 | Hardened region |
| 49 | Hardened region |
| 50 | Raceway wire |
| 51 | Rear side |
| 52 | Cage |
| 53 | Window-like opening |
| 54 | Spacer body |
| 55 | Upper side |
| 56 | Lower side |
| 57 | Edge |
| 58 | Edge |
| 59 | Edge |
| 60 | Lubrication groove |
| 61 | Lubrication groove |
| 62 | Delimiting surface |
| 63 | Delimiting surface |
| 64 | Lubrication groove |
| 65 | Lubrication groove |
| 66 | Hollow-cylindrical side |
| 67 | Hollow-cylindrical side |
| 68 | Opening |
| 69 | Recess |
| 70 | Recess |
| 71 | Raceway wire |
| 72 | Raceway wire |
| 73 | Rear side |
| 74 | Rear side |
| 75 | Pillar |
| 76 | Crosspiece |
| 77 | Upper side |
| 78 | Lower side |
| 79 | End face |
| 80 | Rolling body |
| 81 | Raceway wire |
| 82 | Raceway wire |

The invention claimed is:

1. Roller bearing for rotatably coupling at least two annular connection elements which are concentric to a common axis of rotation and are spaced apart from one another by a gap, at least one of which has a flat end face with fastening means arranged in a ring for placing and fixing the at least one connection element on a footing, chassis, or installation or machine part, wherein there is arranged on each of the two connection elements, in the region of the gap, at least one raceway for at least one row of cylindrical rolling bodies which run therebetween, wherein in the unloaded state of the rolling bearing, the axes of rotation of all the rolling bodies of at least one row of cylindrical rolling bodies lie in a common plane through which the common axis of rotation passes perpendicularly, wherein spacer elements are inserted between two adjacent rolling bodies, and the at least one race-way is in the form of a surface of a wire which has an arcuate, convexly curved cross-sectional profile in its surface region complementary to the race-way surface and is thereby inserted at least in some regions into a peripheral recess having a cross-sectional profile complementary thereto in an annular connection element, wherein each of the spacer elements comprises:
  a lubrication groove in a first pair of delimiting surfaces of the respective spacer element, the first pair of delimiting surfaces of the respective spacer element are arranged radially to the common axis of rotation, and
  a lubrication groove in a second pair of opposing delimiting surfaces of the respective spacer element, the second pair of opposing delimiting surfaces joining the first pair of delimiting surfaces, and wherein the spacer elements each comprise a through-opening.

2. Roller bearing according to claim 1, wherein the two edges of the recess for receiving the race- or slide-way wire lie in a common plane.

3. Roller bearing according to claim 1, wherein the peripheral recess for receiving the race-way wire has a saddle-shaped curved surface region and a doubly concavely curved surface region.

4. Roller bearing according to claim 1, wherein the peripheral recess for receiving the race-way wire has an arcuate cross-section.

5. Roller bearing according to claim 1, wherein the peripheral recess for receiving the race-way wire and the flat end face and the fastening means arranged in a ring for placing and fixing the at least one connection element on a footing, chassis, or installation or machine part are produced by machining or shaping of the same common base body of the at least one connection element.

6. Roller bearing according to claim 1, wherein two or more race-way wires are arranged one above the other in different planes, the two or more race-way wires having equal length.

7. Roller bearing according to claim 1, wherein the peripheral recess for receiving the race-way wire is arranged on a protruding collar of a lug ring and/or on a carrying or holding ring.

8. Roller bearing according to claim 1, wherein a race-way located opposite the race-way wire with respect to the race- or slide-way thereof is incorporated directly into the annular body of the at least one connection element.

9. Roller bearing according to claim 1, wherein a race-way located opposite the race-way wire with respect to the race-way thereof is formed on a race-way wire inserted into a recess therein.

10. Roller bearing according to claim 1, wherein at least one of two mutually associated race-way wires has a rectangular cross-section.

11. Roller bearing according to claim 1, wherein a connection element or a carrying or holding ring part thereof is integrated with a machine or installation part.

12. Roller bearing according to claim 1, wherein the rolling bodies are guided in a cage or in a plurality of cage segments.

13. Roller bearing according to claim 1, wherein
the lubricating grooves in the first pair of delimiting surfaces, and/or the lubricating grooves in the second pair of delimiting surfaces extend in a circumferential direction of the at least one raceway, and/or
the through-openings penetrate spacer elements in the circumferential direction of the at least one raceway.

14. Roller bearing according to claim 1, wherein
the spacer elements comprise straight edges extending radially to the common axis of rotation of rotation, and
the spacer elements comprise arc-shaped edges, which surround the common axis of rotation concentrically.

15. Roller bearing according to claim 1, wherein
the second pair of delimiting surfaces of the spacer elements are arranged parallel to one another, and/or
the second pair of delimiting surfaces each form a ring segment.

16. Roller bearing according to claim 1, wherein
the spacer elements further comprise two hollow-cylindrical delimiting surfaces opposing each other, each joining the first pair delimiting surfaces of the spacer elements and/or each joining the second pair of delimiting surfaces.

* * * * *